United States Patent
Vinje et al.

(10) Patent No.: US 12,474,495 B2
(45) Date of Patent: Nov. 18, 2025

(54) MODELING-BASED MACHINE LEARNING FOR SEISMIC PROCESSING

(71) Applicant: CGG SERVICES SAS, Massy (FR)

(72) Inventors: Vetle Vinje, Oslo (NO); Volodya Hlebnikov, Rykkinn (NO)

(73) Assignee: CGG SERVICES SAS, Massy (FR)

( * ) Notice: Subject to any disclaimer, the term of this patent is extended or adjusted under 35 U.S.C. 154(b) by 1092 days.

(21) Appl. No.: 17/483,197

(22) Filed: Sep. 23, 2021

(65) Prior Publication Data

US 2023/0086711 A1    Mar. 23, 2023

(51) Int. Cl.
*G06N 3/08*    (2023.01)
*G01V 1/36*    (2006.01)
*G06N 3/045*    (2023.01)
*G01V 1/32*    (2006.01)

(52) U.S. Cl.
CPC ............ *G01V 1/362* (2013.01); *G06N 3/045* (2023.01); *G06N 3/08* (2013.01); *G01V 1/32* (2013.01); *G01V 2210/56* (2013.01)

(58) Field of Classification Search
CPC ...... G01V 1/362; G01V 1/32; G01V 2210/56; G06N 3/045; G06N 3/08
See application file for complete search history.

(56) References Cited

U.S. PATENT DOCUMENTS

| | | | | |
|---|---|---|---|---|
| 2013/0135966 A1* | 5/2013 | Rommel | ............ | G01V 1/3808 367/24 |
| 2014/0365131 A1* | 12/2014 | Elboth | ............ | G01V 1/28 702/14 |
| 2017/0115419 A1* | 4/2017 | van Groenestijn | ...... | G01V 1/32 |
| 2018/0120461 A1* | 5/2018 | Allegar | ............ | G01V 1/3817 |
| 2021/0262329 A1* | 8/2021 | Kaur | ............ | G06N 3/08 |
| 2022/0283329 A1* | 9/2022 | Zwartjes | ............ | G01V 1/16 |
| 2023/0140656 A1* | 5/2023 | Hegge | ............ | G01V 1/34 702/14 |

FOREIGN PATENT DOCUMENTS

WO    WO-2020146322 A1 *    7/2020    .......... G01V 1/3843

OTHER PUBLICATIONS

Chengbo Li et al., "Learning from migration and demigration: a practical approach for fast denoising," 2020 Society of Exploration Geophysicists, SEG International Exposition and 90th Annual Meeting, 2020, pp. 2779-2783.
Olaf Ronneberger et al., "U-Net: Convolutional Networks for Biomedical Image Segmentation," Computer Science Department and BIOSS Centre for Biological Signalling Studies, University of Freiburg, Germany, May 18, 2015, 8 pages.

(Continued)

*Primary Examiner* — Krystine E Breier
(74) *Attorney, Agent, or Firm* — PATENT PORTFOLIO BUILDERS PLLC

(57) ABSTRACT

Methods of seismic data processing employ neural networks and use a reflectivity image based on the acquired seismic data to generate output training datasets. The neural networks thus trained are used for generating production datasets, without ghosts, source effects, multiples and/or populating a predetermined set of bins in inline-crossline plane for a set of offset classes.

14 Claims, 12 Drawing Sheets

(56) References Cited

OTHER PUBLICATIONS

S. Hou et al., "Learn to Invert: Surface Wave Inversion with Deep Neural Network," 81st EAGE Conference & Exhibition 2019—Workshop Program, Jun. 3-6, 2019, London, Uk, WS10_02, 5 pages.

S. Hou et al., "Seismic Processing with Deep Convolutional Neural Networks: Opportunities and Challenges," 82nd EAGE Conference & Exhibition 2020, Dec. 8-11, 2020, Amsterdam, The Netherlands, Th_Forum_17, 5 pages.

Shan Qu et al., "Training deep networks with only synthetic data: Deep-learning-based near-offset reconstruction for (closed-loop) surface-related multiple estimation on shallow-water field data," Geophysics, May-Jun. 2021, pp. A39-A43, vol. 86, No. 3.

Thomas Andre Larsen Greiner et al., "Cross-streamer wavefield reconstruction through wavelet domain learning," Geophysics, Nov.-Dec. 2020, pp. V457-V471, vol. 85, No. 6.

Thomas Larsen Greiner et al., "Cross-streamer wavefield interpolation using deep convolutional neural network," 2019 SEG, SEG International Exposition and 89th Annual Meeting, 2019, pp. 2207-2211.

Wenqian Fang et al., "Seismic data interpolation based on U-net with texture loss," Geophysics, Jan.-Feb. 2021, pp. V41-V54, vol. 86, No. 1.

Yingying Wang et al., "Seismic trace interpolation for irregularly spatial sampled data using convolutional autoencoder," Geophysics, Mar.-Apr. 2020, pp. V119-V130, vol. 85, No. 2.

\* cited by examiner

510

1100

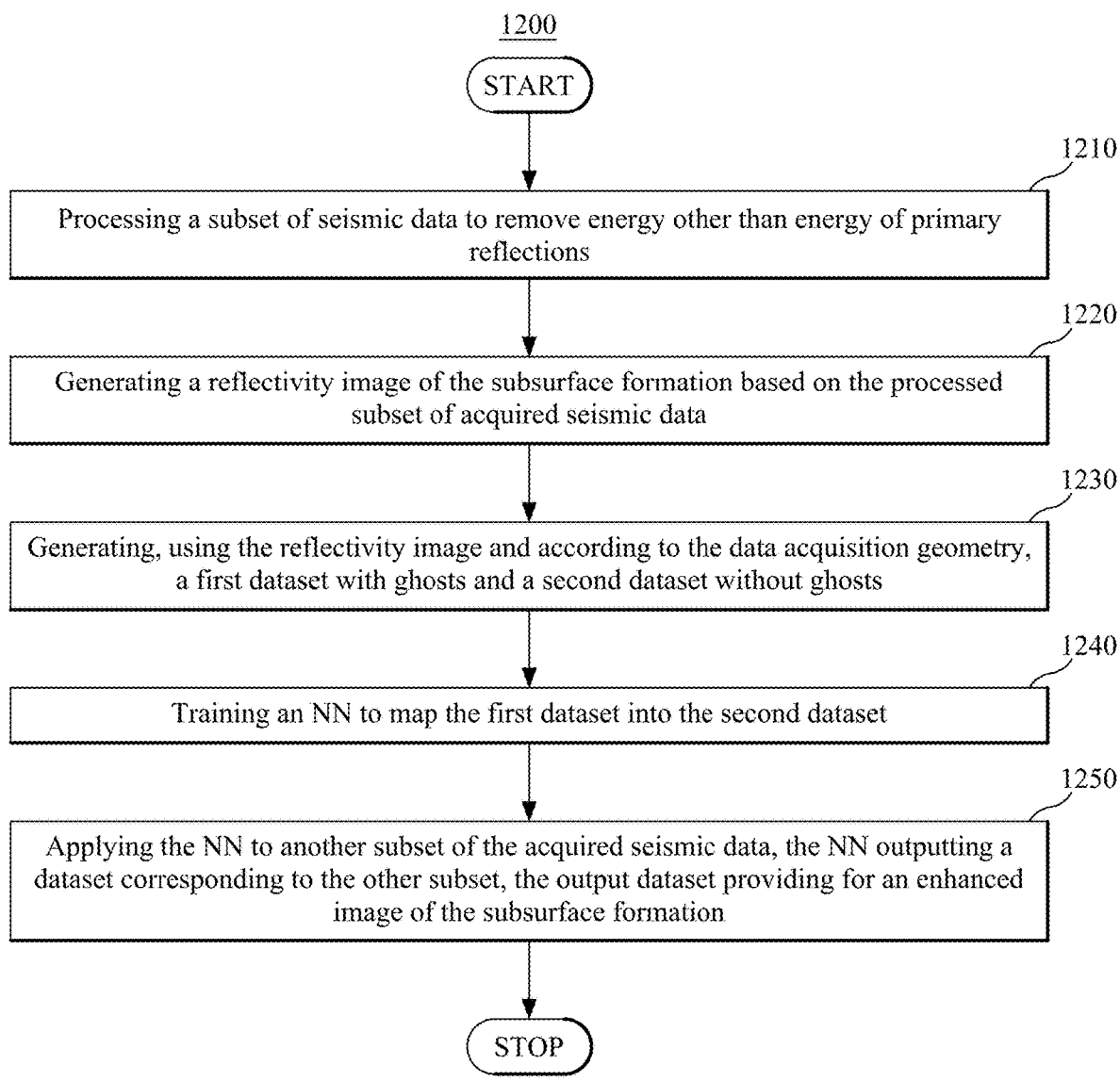

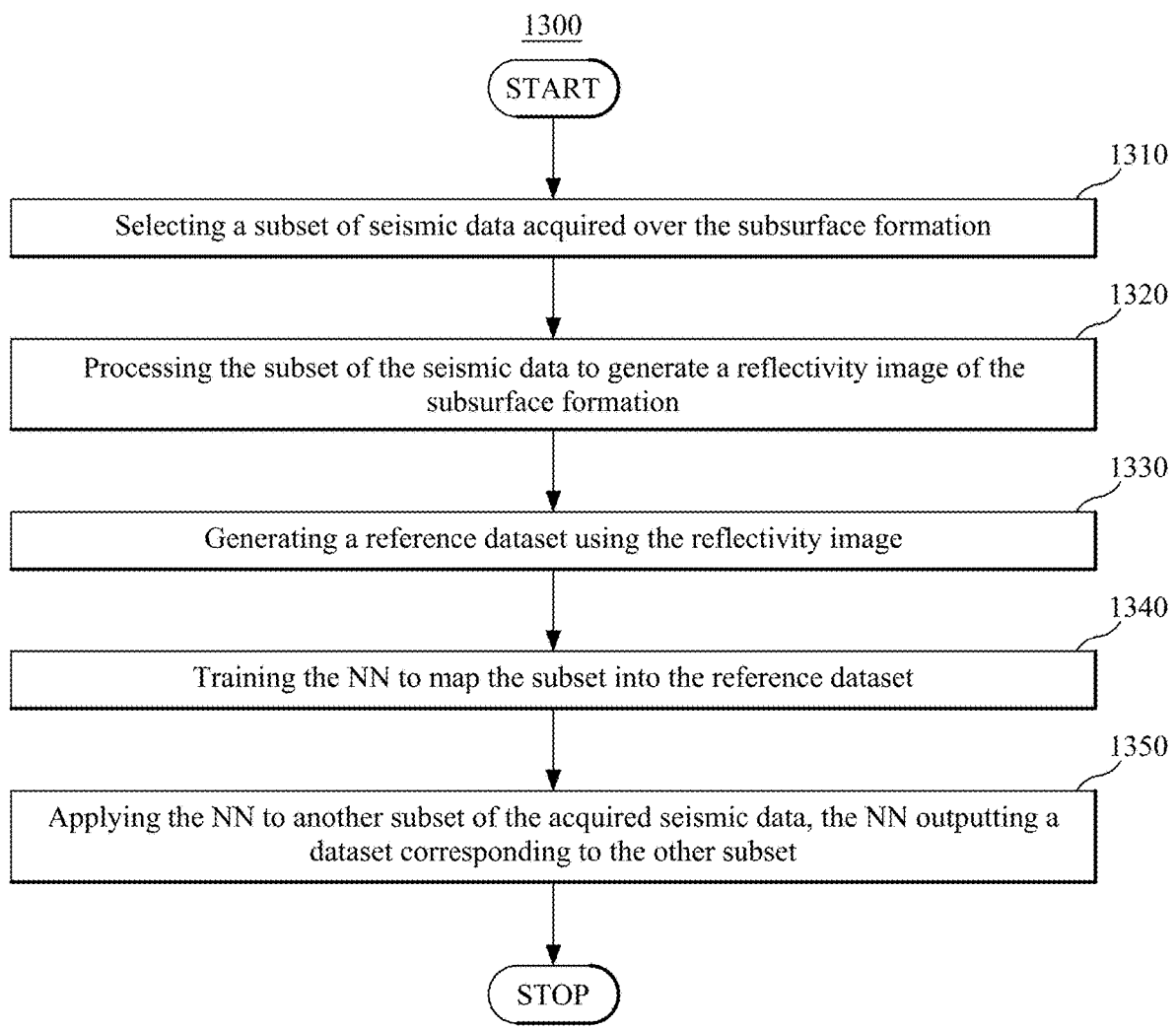

MODELING-BASED MACHINE LEARNING FOR SEISMIC PROCESSING

TECHNICAL FIELD

Embodiments of the subject matter disclosed herein generally relate to methods and systems that use modeling-based machine learning to expedite seismic data processing; more particularly, to training neural networks (NNs) to solve a range of processing issues using synthetically modelled data from an estimation of the reflectivity and velocity of the subsurface.

DISCUSSION OF THE BACKGROUND

The information carried by seismic waves traveling through an underground formation has been used for the exploration of oil and gas. An image of the underground formation's structure is generated based on this information to learn about the geology of the underground formation. During seismic surveys (i.e., seismic data acquisition over an area of interest) conducted either on land or at sea, seismic waves are generated by impulsive or vibrating sources, and detectors (i.e., seismic sensors) record seismic data representing the reflected seismic waves carrying information on the nature and geological significance of the environment they traveled through.

Seismic data actually represents several types of waves/energy and other inherent effects: primary reflected energy (i.e., seismic waves reflected at layer interfaces inside the subsurface formation and detected without downward traveling, except for the initial propagation from the source to the reflecting interface), water-surface generated multiples (i.e., in the case of a marine environment survey, seismic waves that are redirected downward into the formation by reflections at the water-surface), internal multiples (seismic waves that are redirected downward by reflections at interfaces inside the subsurface formation), water surface generated ghost on the source and the receiver side (i.e., again only in the case of a marine environment, seismic waves that are reflected by the water surface before traveling downward to enter the subsurface formation, or after emerging from the subsurface formation before being detected), converted waves (from P- to S-waves and from S- to P-waves), source and receiver instrument effects and various other types of noise. Seismic processing aims to remove all the types of waves/energy above, except for the primary P-wave reflections, from the subsurface structures.

Ideally, the signature of the source should be compensated for so that the response from each interface (reflector or diffractor) in the subsurface is a spiky, zero-phase wavelet. The signature of the source is a far-field waveform resulting from merging the seismic waves generated by different source elements, the far-field waveform no longer varying in shape (only in magnitude) with distance.

The primary P-wave reflected data is used by an image-forming process called migration. Some migration methods (e.g., Kirchhoff migration or beam migration) require fully populated offset classes (e.g., data regularized and interpolated to cover a grid of inline-crossline bins for each offset class) to generate a complete structural image of the explored formation. Here "offset" is a horizontal distance between a seismic source and a receiver that records detected seismic waves as seismic data. Each offset class covers a range of offsets. Data acquisition acquires more data for some offset classes than for others. The structural images obtained by migration from seismic data may represent reflectivity at interfaces inside the subsurface formation or a wave propagation velocity inside the subsurface formation.

Seismic data processing is a complex process requiring computing time, knowledge and ingenuity to achieve accurate images. Recently, artificial intelligence, machine learning and, more specifically, neural networks (NNs) have started being used in seismic processing. The use of NNs substantially increases processing speed. NNs are trained to model a function that yields training output data upon receiving training input data. Trained NNs then receive production input data of the same nature with the training input data and predict output data corresponding to the production input data.

FIG. 1 illustrates a process 100 of using an NN in seismic processing. Process 100 has a training phase and an application or production phase. Image 110 called "Labeled data" represents training input data. Image 120 called "Labels" represents training output data. Input-output pairs of seismic images selected to be representative are used for model training at 130, to teach the NN to emulate a non-linear function that maps the "Labeled data" to the "Labels." In the application phase, production input 140 is fed to the NN operating according to Model 150 to obtain a corresponding predicted output 160.

The quality of the models depends on the manner of designing the training phase and selecting representative data. There is a need to continue improving the efficiency and accuracy of using NNs in seismic data processing.

SUMMARY

Methods and apparatuses according to various embodiments use NNs in seismic data processing that removes energy/waves other than primary energy/waves from seismic data and for interpolation/regularization of the seismic data.

According to an embodiment there is a method for exploring a subsurface formation. The method includes processing a subset of seismic data acquired over the subsurface formation with a data acquisition geometry to remove energy other than energy of primary reflections. The subset of seismic data that corresponds to one or more offset classes. The method further includes generating a reflectivity image of the subsurface formation based on the processed subset of acquired seismic data, and generating, using the reflectivity image, a reference dataset having a predetermined set of bins in the inline-crossline plane populated for the one or more offset classes. The method then includes training an NN to map the processed subset into the reference dataset, and applying the NN to at least another processed subset of the acquired seismic data. The NN outputs a dataset having the predetermined set of bins populated and corresponding to the at least another subset, the output dataset providing for an enhanced image of the subsurface formation.

According to another embodiment, there is a method for deghosting seismic data acquired over a subsurface formation, using an NN. The method includes processing a subset of seismic data acquired over the subsurface formation with a data acquisition geometry, to remove energy other than energy of primary reflections. The method further includes generating a reflectivity image of the subsurface formation based on the processed subset of seismic data, and generating, using the reflectivity image and according to the data acquisition geometry, a first dataset with ghosts and a second dataset without ghosts. The method then includes training the NN to map the first dataset into the second dataset and applying the NN to at least another subset of the acquired seismic data, the NN outputting a dataset corresponding to the at least another subset, the output dataset being a deghosted dataset providing for an enhanced image of the subsurface formation.

According to yet another embodiment, there is a method for exploring a subsurface formation, the method removing source effects, ghosts and/or multiples from seismic data using an NN. The method includes selecting a subset of seismic data acquired over the subsurface formation, processing the subset of the seismic data to generate a reflectivity image of the subsurface formation, generating a reference dataset using the reflectivity image, training the NN to map the subset into the reference dataset, and applying the NN to another subset of the acquired seismic data. The NN outputs a dataset corresponding to the other subset, the output dataset providing for an enhanced image of the subsurface formation.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 is a flowchart of a method for exploring a subsurface formation, the method deghosting data using an NN, according to an embodiment;

FIG. 13 is a flowchart of a method for exploring a subsurface formation using an NN, according to another embodiment.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Figure 1:
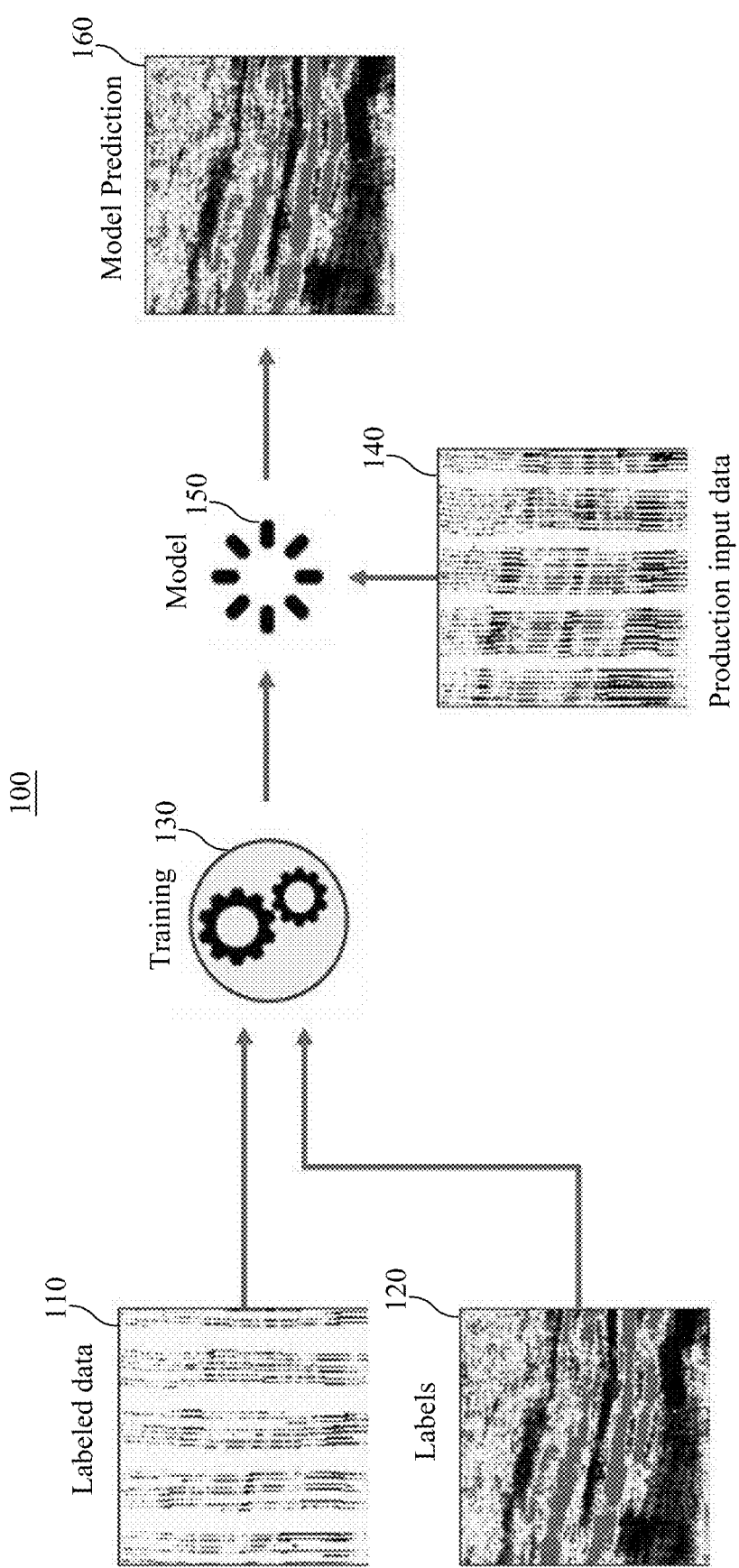
FIG. 1 is a flowchart illustrating seismic data processing using a neural network.
Figure 2:
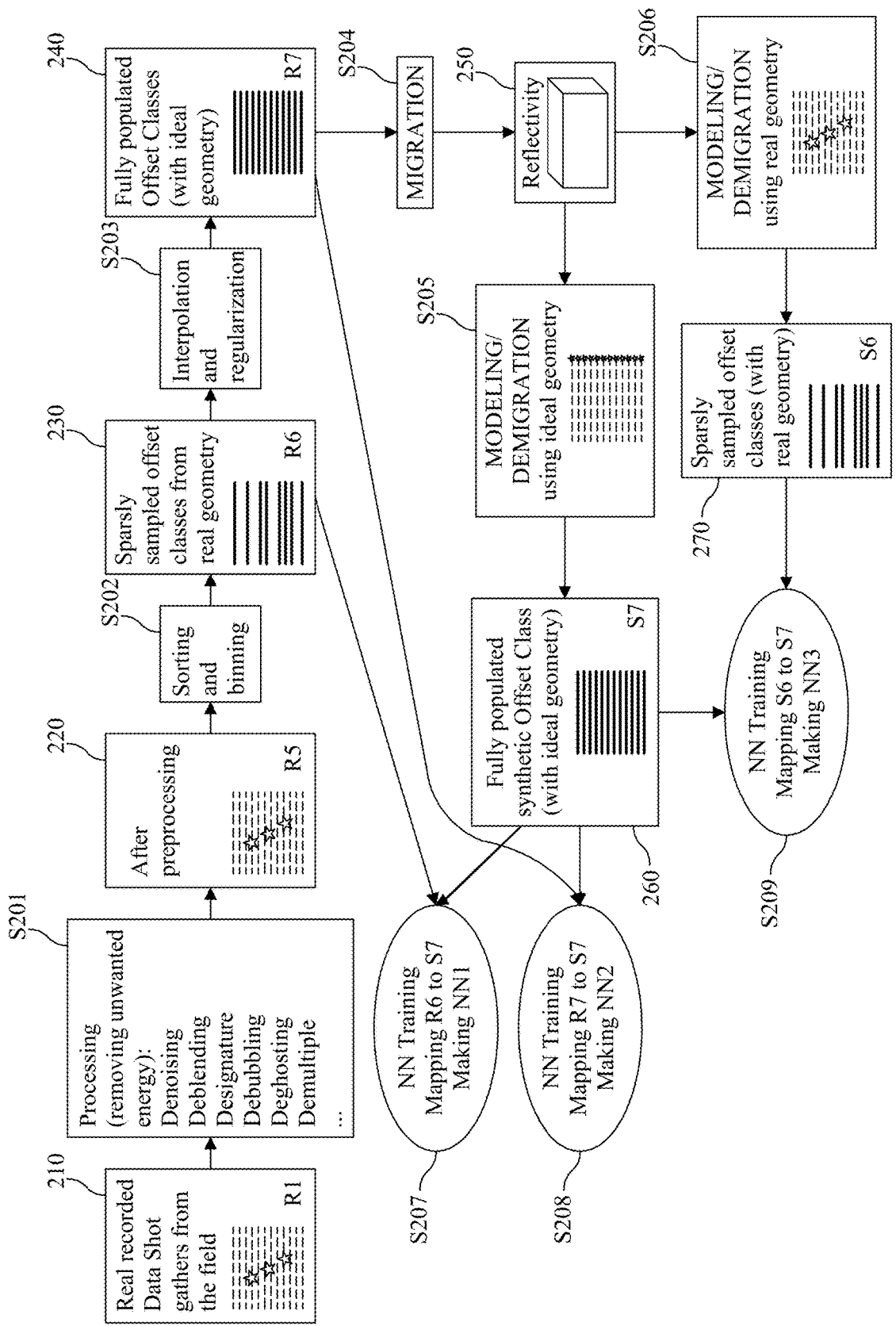
FIG. 2 illustrates a method using a reflectivity image obtained from acquired data to train NNs usable to generate datasets with populated regular bins for two or more offset classes, according to an embodiment.

The embodiments described in this section use neural networks (NNs) to remove energy/waves other than primary waves from seismic data. One challenge in the use of neural networks is finding good training data (i.e., input-output pairs of images) because the quality of the predicted output data resulting from production is bounded by the quality of the training. In the past, simulated data (e.g., data generated based on a model of the substructure formation), which does not include ghosts, multiples, converted waves and noise, has been used as training output data. However, simulated data differs from acquired data more than is desirable (too simplistic from the point of view of types of reflections, bandwidth, etc.). The embodiments described in this section employ an image resulting from processing of a portion of the acquired seismic data as training output data or to generate as training output data. FIG. 2 illustrates this approach to training NNs used for processing seismic data.

In FIG. 2, real data 210 (labeled "R1") acquired over the explored subsurface formation is subjected to preprocessing for removing unwanted energy (waves and noise) in S201. Although the description of the method illustrated in FIG. 2 refers to the entire dataset and all offset classes, only a representative portion thereof and possibly only one or less than all offset classes may be used for training (e.g., about 10% of the data). Step S201 may include denoising, deblending, removing source signature (i.e., designature if the source was a multi-element source), debubbling (if removal of bubble oscillations is necessary in a marine environment), deghosting, demultiple, etc. The preprocessing is performed using known techniques and yields preprocessed data 220 (labeled "R5," labels "R2," "R3" and "R4" are used later, when the preprocessing is illustrated in more detail). Preprocessed data 220 is then sorted and binned at S202, to obtain binned data 230 (labeled "R6") with irregularly populated bins in offset classes due to the data acquisition geometry.

Figure 3:
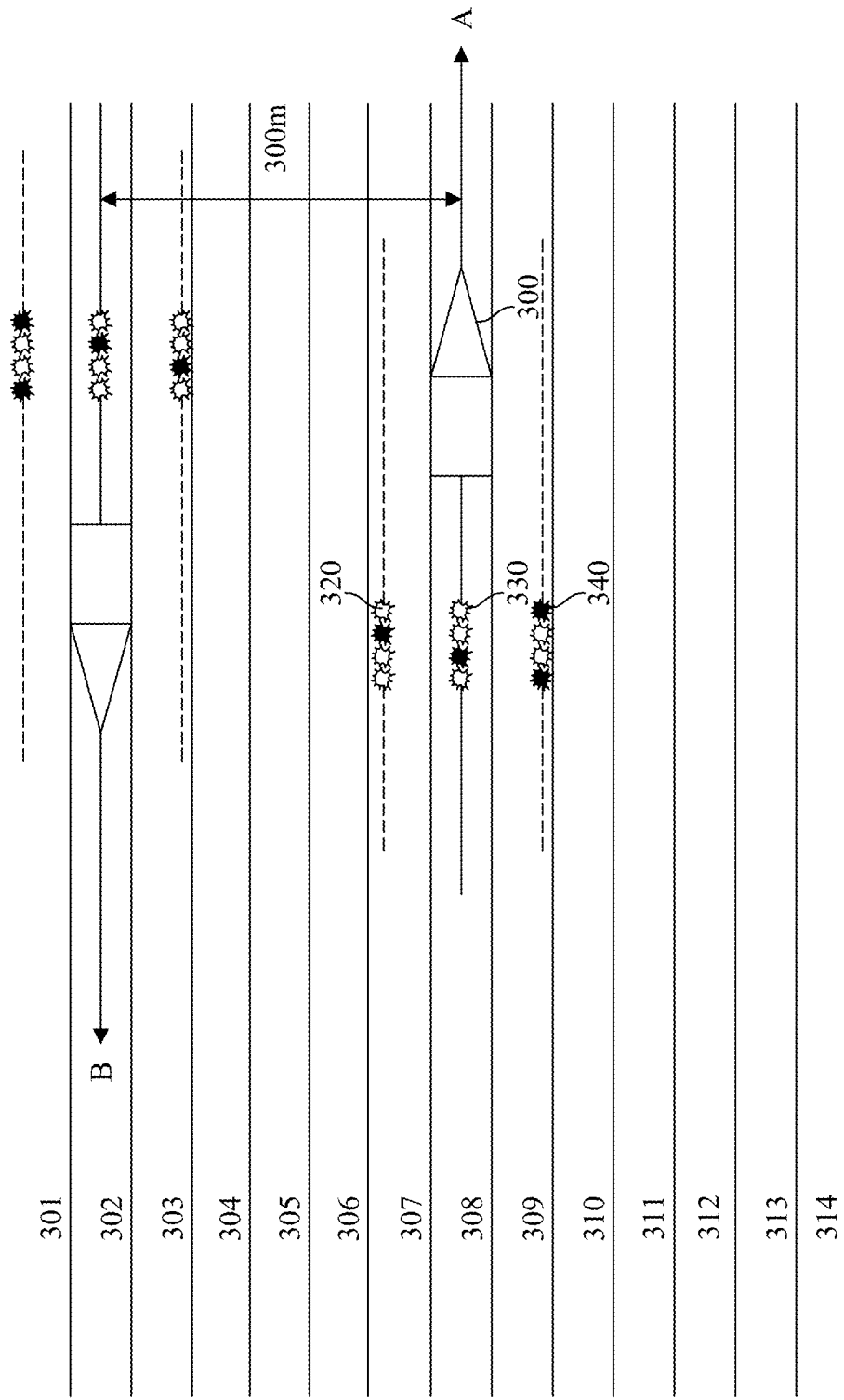
FIG. 3 represents a data acquisition geometry.

For example, consider a data acquisition geometry illustrated in FIG. 3 with 14 streamers having an inter-streamer crossline separation of 50 m and receivers at 12.5 m along the streamers. The three sources 310, 320, 330 at a crossline separation of 66.68 m have 4 source elements each spanning 25 m (i.e., with an 8.33 m inline in between the source elements). The streamers and the sources are towed along sail lines A and B that are 300 m from one another.

Figure 4:
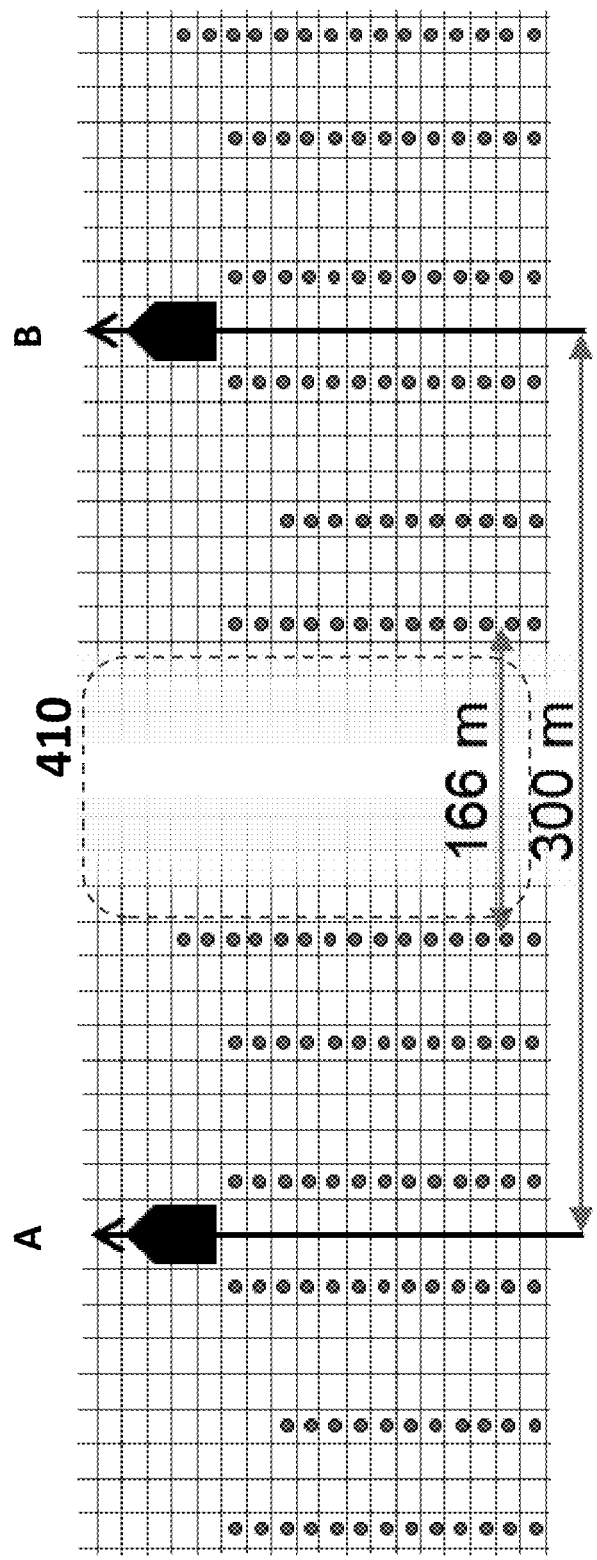
FIG. 4 shows binned data for a 0-50 m offset class for the data acquisition geometry in FIG. 3.

For a crossline-inline (dx,dy) bin size (6.25, 8.33) m illustrated in FIG. 4, the data acquisition geometry illustrated in FIG. 3 populates only some of the bins of an offset range of 0-50 m (i.e., an offset class), with a fully empty area 410 (not represented at scale) between the sail lines.

Figure 5:
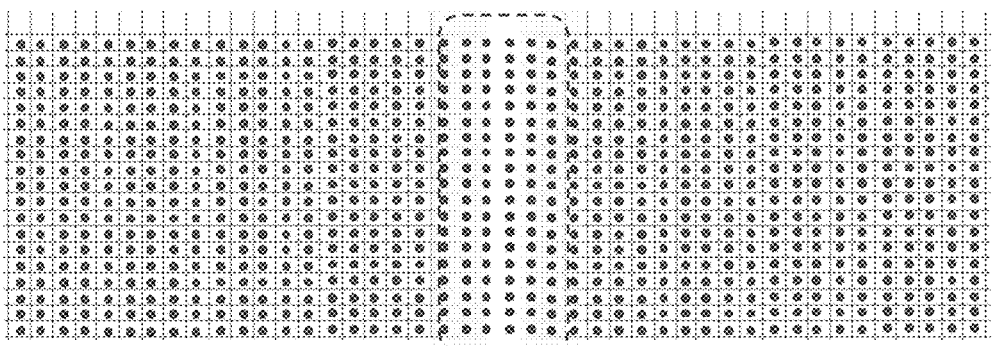
FIG. 5 illustrates data with fully populated bins.
Figure 6:
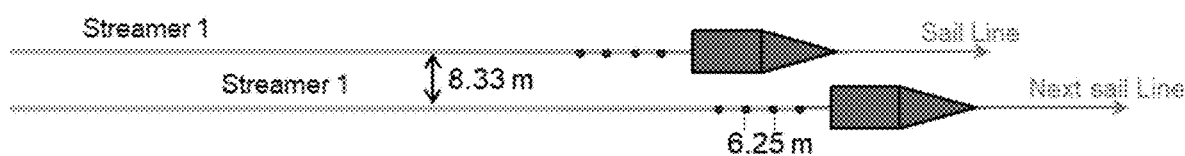
FIG. 6 illustrates an acquisition system that could acquire the data illustrated in FIG. 5.

Returning now to FIG. 2, binned data 230 is then interpolated and regularized at S203 to generate seismic data 240 (labeled "R7") with fully populated offset classes. FIG. 5 illustrates such data with fully populated bins, including in the empty bins in FIG. 4. This kind of data density would be achievable by an acquisition system as illustrated in FIG. 6, having one streamer and one source with source elements at 6.25 m inline interval, sailing with 8.33 m crossline distance between sail lines.

At S204, seismic data with fully populated offset classes is migrated to obtain a reflectivity image 250 of the explored subsurface formation. The reflectivity image may also be generated using a full wavefield inversion approach. It should be understood that this reflectivity image is only an approximation, not the best achievable reflectivity image. Reflectivity image may be in (x,y,z) domain (i.e, inline, crossline, depth), or in (x,y,t) domain (where t stands for traveltime to the reflection site).

Reflectivity image 250 may then be used at S205 to generate a dataset 260 (labeled "S7") in space-time domain, with fully populated bins for the offset classes (e.g., similar to FIG. 5). Note that datasets resulting from processing real data are labeled R #, while simulated or synthetic datasets are labeled S #; the number # indicate characteristics, e.g., "1" raw data, "6" sparsely and irregularly sampled, "7" ideal etc. Dataset 260 corresponds to an ideal data acquisition geometry (e.g., the one illustrated in FIG. 6) with constant offset in each bin and zero azimuth. Alternatively or additionally, reflectivity image 250 may then be used at S206 to generate a dataset 270 (labeled "S6") sparsely and irregularly sampled (e.g., as in FIG. 4) obtained with the real data acquisition geometry (e.g., in FIG. 3). Generating datasets based on reflectivity image and a corresponding seismic velocity field may use demigration, diffraction modeling, one-way wave-equation modeling or two-way wave-equation modeling.

Further, an NN (call it "NN1") may be trained to map R6 (i.e., real processed data at real data acquisition positions) to S7 (i.e., a dataset generated based on the reflectivity image 250 and having regularized data) at S207. Trained NN1 is then usable to map R6 to a new version of R7. In fact, trained NN1 generates a dataset with fully populated bins in any offset classes from an input preprocessed and sorted seismic dataset.

Alternatively or additionally, an NN (call it "NN2") may be trained to map regularized real data R7 to regularized dataset S7 at S208, and/or an NN (call it "NN3") may be trained to map S6 (i.e., the dataset generated based on the reflectivity image at the data acquisition positions) to S7 at S209. Trained NN2 is able to convert/map an existing version of R7 to a new version of R7. Moreover, trained NN2 is able to generate a dataset with fully populated bins in any offset classes from an input preprocessed, sorted and interpolated/regularized seismic dataset. NN3 is usable to map an existing version of R6 to a new version of R7. Furthermore, trained NN3 is usable to generate a dataset with fully populated bins in any offset classes from an input preprocessed and sorted seismic dataset.

Figure 7:
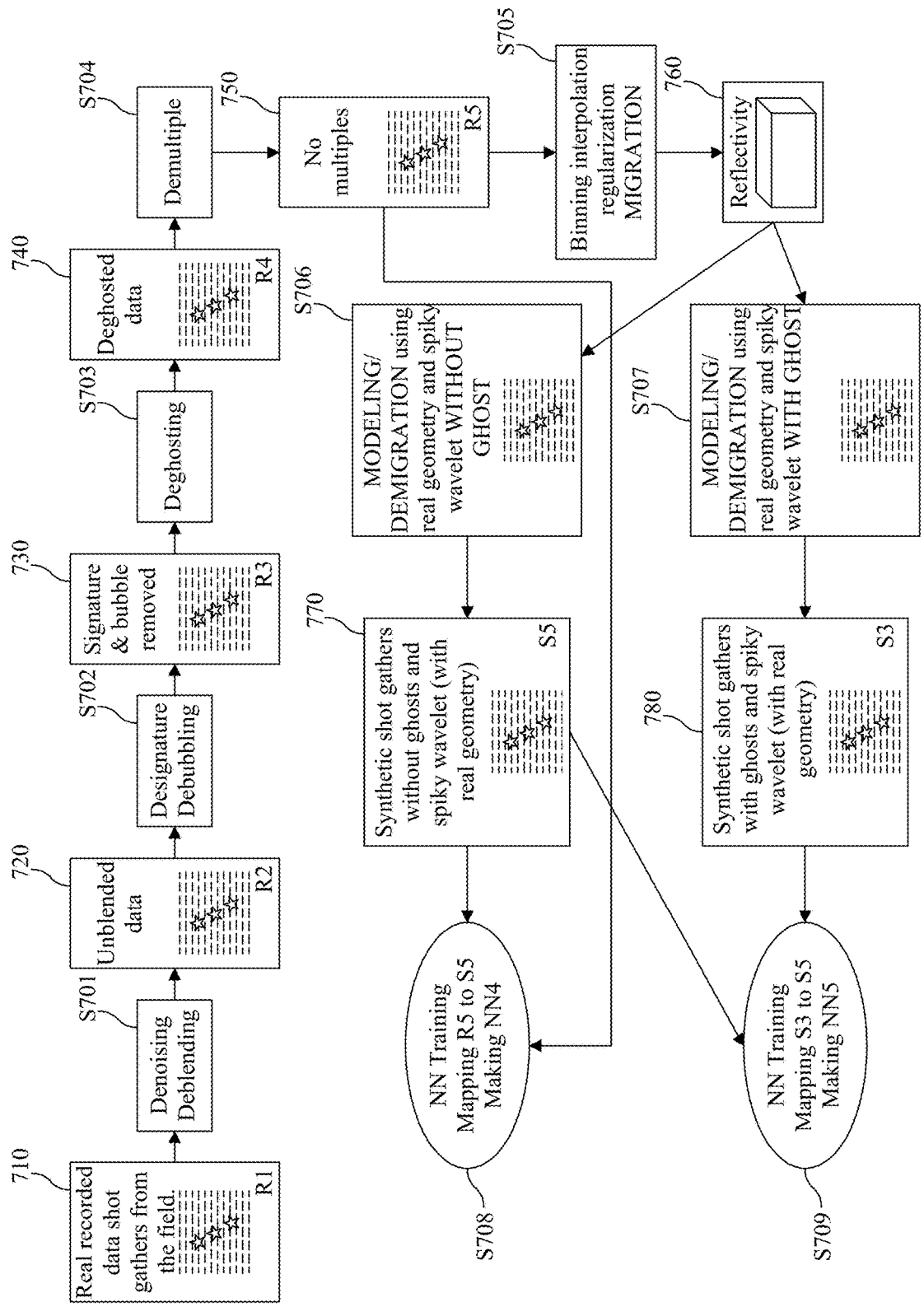
FIG. 7 illustrates a method using a reflectivity image obtained from acquired data to train NNs usable to generate deghosted datasets according to an embodiment.

FIG. 7 is a schematic view of a method used to train a neural network for deghosting. Real raw data 710 (labeled "R1" as in FIG. 2) is first denoised (e.g., lowcut-filtering, removal of impulsive noise, swell noise, static noise, seismic interference noise) and deblended (in case data has been acquired with overlapping listening time so that one receiver records waves due to different sources simultaneously) at S701, yielding unblended data 720 (labeled "R2"). Then, unblended data 720 is subjected to source signature and bubble effect removal at S702 if such techniques are pertinent to yield a dataset 730 (labeled "R3") free from source effects. Dataset 730 is then deghosted at S703 to generate a dataset 740 (labeled "R4") without ghost energy (i.e., without the energy due to seismic waves that are reflected by the water surface before traveling downward to enter the subsurface formation, or after emerging from the subsurface formation but before being detected). Deghosted dataset 740 is then subjected to a process of removing multiples at S704 (using, e.g., surface related multiple elimination technique, surface related multiple modeling, Radon transformations, i-p deconvolution). That is, energy of seismic waves which bounced down at least once being reflected inside the subsurface formation is removed to obtain a preprocessed dataset 750 (labeled "R5," being similar to dataset 220), this dataset mainly including the primary reflected energy. This preprocessed dataset is then binned, interpolated-regularized and migrated at S705 to obtain a reflectivity image 760 of the explored subsurface formation. As already mentioned relative to S204 in FIG. 2, the reflectivity image may also be generated using a full wavefield inversion approach. Reflectivity image may be in (x,y,z) domain (i.e, inline, crossline, depth), or in (x,y,t) domain (where t stands for traveltime to the reflection site).

Reflectivity image 760 may then be used at S706 to generate a dataset 770 (labeled "S5") in space-time domain without ghosts and source effects, dataset 770 being generated to emulate the data acquisition geometry. Alternatively or additionally, reflectivity image 760 may be used at S707 to generate a dataset 780 (labeled "S3") emulating synthetic shot gathers including ghosts. Thus, dataset 770 does not include ghosts, while dataset 780 includes ghosts. Both S3 and S5 mimic the real geometry, with source and receiver positions as in the real survey.

Further, an NN ("NN4") may be trained to map R5 (real data) to S5 (dataset without ghosts and source effects generated based on the reflectivity image 760) at S708. NN4 is then usable to generate an improved deghosted dataset upon receiving as input a subset or the entire set of acquired seismic data after preprocessing, removing source effect(s), deghosting and demultipling. Alternatively or additionally, an NN ("NN5") may be trained to map S3 to S5 at S709. NN5 is then usable to generate an improved deghosted dataset upon receiving a subset or the entire set of acquired seismic data after denoising/deblending and removal of source effects.

Figure 8:
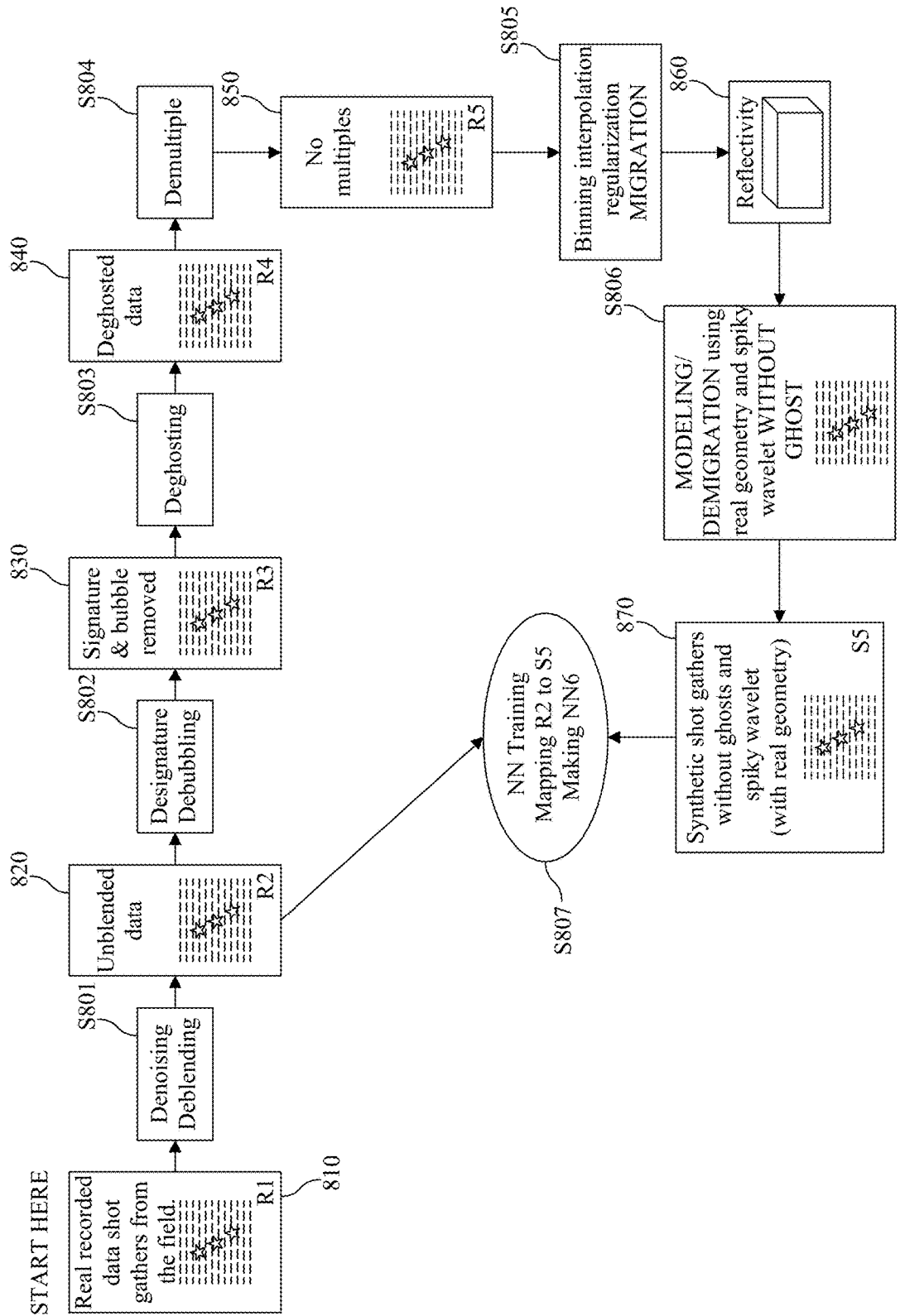
FIG. 8 illustrates a method using a reflectivity image obtained from acquired data to train an NN usable to generate datasets without ghosts, source effects and demultiples according to an embodiment.

FIG. 8 is a schematic view of a method used to train a neural network for suppressing source effect(s) (i.e., signature and bubble), ghosts and multiples. Real data 810 (labeled "R1" as in FIGS. 2 and 7) acquired over an explored subsurface formation is first denoised and deblended at S801, yielding unblended data 820 (labeled "R2"). Then, unblended data 820 is subjected to source signature and bubble effect removal at S802 to yield a dataset 830 (labeled "R3") free from source effects. Dataset 830 is then deghosted at S803 to generate a dataset 840 (labeled "R4") without ghost energy. Deghosted dataset 840 is then subjected to a process of removing multiples at S804 to obtain a dataset 850 (labeled "R5") including mainly the primary energy. Dataset 850 is then binned, interpolated-regularized and migrated at S805 to obtain a reflectivity image 860 of the explored subsurface formation. As mentioned above, the reflectivity image may be generated using a full wavefield inversion approach, and may be in (x,y,z) domain or in (x,y,t) domain.

Reflectivity image 860 may then be used at S806 to generate a dataset 870 (called "S5") in space-time domain without source effects, ghosts and multiples, dataset 870 emulating the data acquisition geometry. An NN ("NN6") is trained to map R2 to S5 at S807. NN6 is then able to generate an improved deghosted, demultipled dataset free from source effects upon receiving as input a subset or the entire set of acquired seismic data denoised and deblended.

Figure 9:
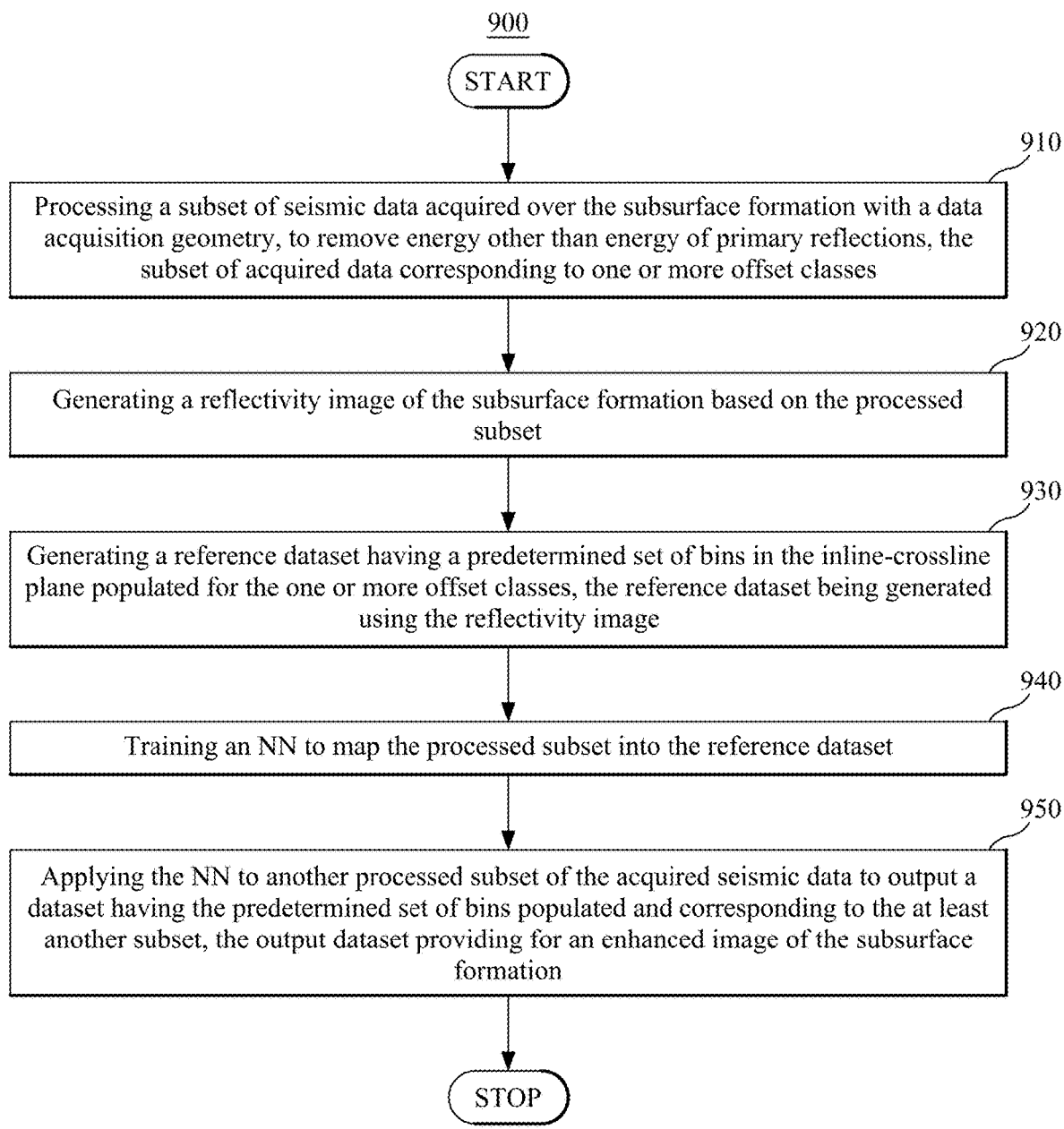
FIG. 9 is a flowchart of a method for exploring a subsurface formation using an NN trained with data generated based on a reflectivity image according to an embodiment.

FIG. 9 is a flowchart of a method 900 for training an NN in order to process seismic data acquired over a subsurface formation according to an embodiment. Method 900 includes processing a subset of seismic data acquired over the subsurface formation with a data acquisition geometry, to remove energy other than energy of primary reflections at 910. The subset of seismic data corresponds to one or more offset classes; that is, it may correspond to a single offset class (e.g., for the range 0-50 m as illustrated in FIG. 4), or to plural or even all offset classes. The processing of the subset of seismic data may include denoising, deblending, debubbling, source signature removal, deghosting and demultipling. That is, if all these procedures are necessary all are going to be applied. However, if seismic data is not blended, deblending is not applied.

Method 900 further includes generating a reflectivity image of the subsurface formation based on the processed subset of acquired seismic data at 920. Prior to migrating data processed subset for obtaining the reflectivity image the processed subset may be interpolated and regularized to populate a predetermined set of bins in the inline-crossline plane. For example, the predetermined set of bins may be a rectangular grid of horizontal bins.

Method 900 further includes generating a reference dataset (e.g., S7 in FIG. 2) having the predetermined set of bins in the inline-crossline plane populated for the one or more offset classes, the reference dataset being generated using the reflectivity image.

Then, at 940, an NN is trained to map the processed subset into the reference dataset. The reference dataset may be generated by demigration, diffraction modeling, one-way wave-equation modeling or two-way wave-equation modeling.

Figure 10:
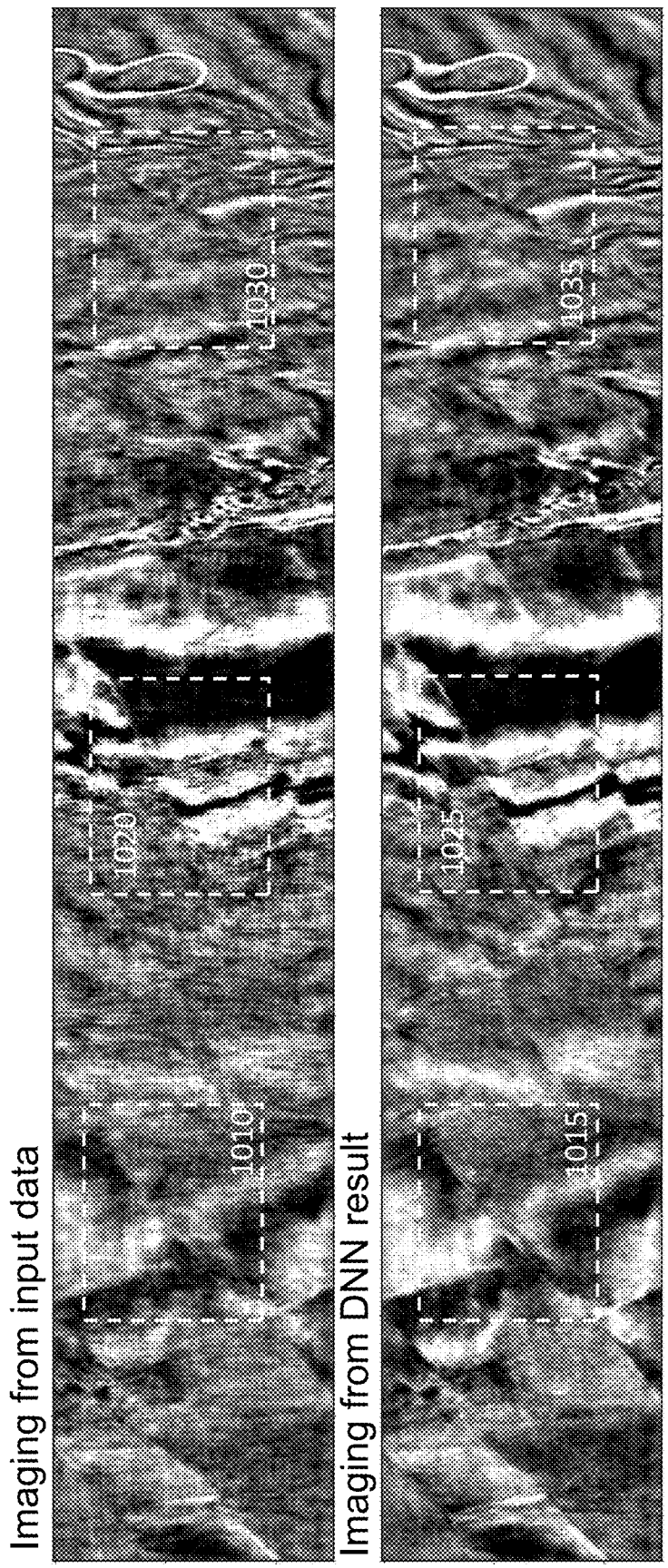
FIG. 10 illustrates an image of an explored subsurface formation obtained without using the NN and an image of the subsurface formation obtained=using the NN.

Method 900 then includes applying the NN to another processed subset of the acquired seismic data to output a dataset having the predetermined set of bins populated and corresponding to the other subset. The output dataset provides for an enhanced image of the subsurface formation. For example, FIG. 10 represents the same timeslice at 900 ms (i.e., an inline/crossline horizontal plane), the nuances of grey representing amplitude. The upper image is obtained using the original data and the lower image is NN data. The better definition of geological features is visible when comparing areas 1010 with 1015, 1020 with 1025 and 1030 with 1035.

In one embodiment, the processed subset may be regularized and interpolated to populate the set of predetermined bins before being used for the training of the neural network.

Another dataset may be generated using the reflectivity image, the other dataset having bins populated according to the data acquisition geometry and the one or more offset classes and the one or more offset classes of the processed dataset. A second NN is then trained to map the other dataset into the reference dataset. The second NN is then applied to any other processed subset of the seismic data to output another dataset regularly populating the predetermined set of bins corresponding to the at least another subset. The other output dataset enables another enhanced image of the subsurface formation.

Figure 11:
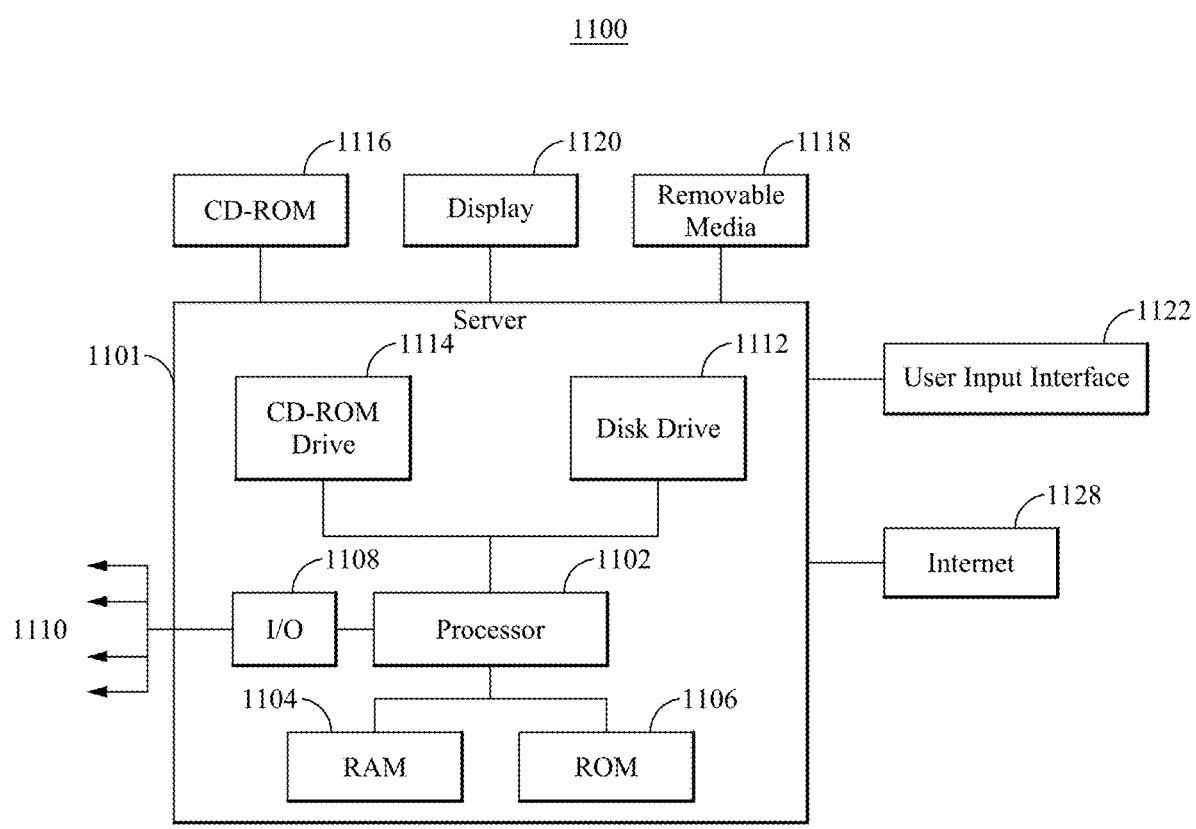
FIG. 11 is a schematic diagram of a data processing apparatus according to an embodiment.

The methods described in this section may be performed using a computing device 1100 as illustrated in FIG. 11. Hardware, firmware, software or a combination thereof may be used to perform the various steps and operations described herein.

Exemplary computing device 1100 suitable for performing the activities described in the exemplary embodiments may include a server 1101. Server 1101 may include a central processor (CPU or GPU) 1102 coupled to a random-access memory (RAM) 1104 and to a read-only memory (ROM) 1106. RAM 1104 may store executable codes for which when executed by one of more processors make the processor perform methods according to various embodiments described in this section. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. The I/O circuitry 1108 may obtain the seismic data.

Processor 1102 carries out a variety of functions as are known in the art, as dictated by software and/or firmware instructions. The processor may carry out the operations of the methods according to various embodiments.

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, detectors, etc. The server may be part of a larger network configuration, as in a global area network such as the Internet 1128, which allows ultimate connection to various computing devices.

FIG. 12 is a flowchart of a method 1200 for exploring a subsurface formation, the method deghosting data using a neural network, according to an embodiment. Method 1200 includes processing a subset of seismic data acquired over the subsurface formation with a data acquisition geometry to remove energy other than energy of primary reflections. The processing of the subset of seismic data includes a combination of denoising, deblending, debubling, source signature removal, deghosting, demultipling, interpolating and regularizing.

Method 1200 further includes generating a reflectivity image of the subsurface formation based on the processed subset of seismic data at 1220 and generating a first dataset with ghosts and a second dataset without ghosts using the reflectivity image and according to the data acquisition geometry at 1230. One or both the first and the second dataset may be generated by demigration, diffraction modeling, one-way wave-equation modeling or two-way wave-equation modeling.

Method 1200 further includes training the NN to map the first dataset into the second dataset at 1240 and applying the NN to at least another subset of the acquired seismic data, the NN outputting a dataset corresponding to the at least another subset, the output dataset providing for an enhanced image of the subsurface formation at 1250.

In one embodiment, method 1200 further includes training a second NN to map the processed dataset into the second dataset and applying the second NN to any other processed subset of the seismic data, the second NN outputting another dataset corresponding to the at least another subset, the output dataset enabling another enhanced image of the subsurface formation.

FIG. 13 is a flowchart of a method 1300 for exploring a subsurface formation, according to yet another embodiment. Method 1300 removes source effects, ghosts and multiples from seismic data using an NN. Method 1300 includes selecting a subset of seismic data acquired over the subsurface formation at 1310 and processing the subset of the seismic data to generate a reflectivity image of the subsurface formation at 1320. The subset of seismic data may include a single offset class or few offset classes. Preferably, the selected subset of seismic data is representative for the entire seismic data. The processing of the subset of acquired data includes a combination of denoising, deblending, debubling, source signature removal, deghosting, demultipling, interpolating, regularizing and/or migrating.

Method 1300 further includes generating a reference dataset using the reflectivity image at 1330. The reference dataset may be generated by demigration, diffraction modeling, one-way wave-equation modeling or two-way wave-equation modeling. Method 1300 then includes training the NN to map the subset into the reference dataset at 1340 and applying the NN to another subset of the acquired seismic data, the NN outputting a dataset corresponding to the at least another subset at 1350. The output dataset provides for an enhanced image of the subsurface formation.

The embodiments described in this section provide methods and apparatuses use NNs to process seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A method for exploring a subsurface formation, the method comprising:
processing a subset of seismic data acquired over the subsurface formation with a data acquisition geometry, to remove energy other than energy of primary reflections, the subset of seismic data corresponding to one or more offset classes;
generating a reflectivity image of the subsurface formation based on the processed subset of acquired seismic data;
generating a reference dataset having a predetermined set of bins in the inline-crossline plane populated for the one or more offset classes, the reference dataset being generated using the reflectivity image;
training a neural network, NN, to map the processed subset into the reference dataset; and
applying the NN to at least another processed subset of the acquired seismic data, the NN outputting a dataset having the predetermined set of bins populated and corresponding to the at least another subset, the output dataset providing for an enhanced image of the subsurface formation.

2. The method of claim 1, wherein the predetermined set of bins is a rectangular grid with sides smaller than or equal to a distance between receivers.

3. The method of claim 1, wherein the processing of the subset of seismic data includes denoising, deblending, debubbling, source signature removal, deghosting and demultipling.

4. The method of claim 1, wherein the processed subset is regularized and interpolated to populate the set of predetermined bins before being used for the training of the neural network.

5. The method of claim 1, further comprising:
generating a second dataset using the reflectivity image, the second dataset having bins in the inline-crossline plane populated according to the data acquisition geometry and the one or more offset classes;
training a second NN to map the second dataset into the reference dataset;
applying the second NN to a third processed subset of the seismic data, the second NN outputting a second output dataset with the predetermined set of bins populated and corresponding to the third subset, the second output dataset enabling a second enhanced image of the subsurface formation.

6. The method of claim 1, wherein the reference dataset is generated by demigration, diffraction modeling, one-way wave-equation modeling or two-way wave-equation modeling.

7. The method of claim 1, further comprising:
obtaining the seismic data via an interface of a data processing apparatus,
wherein one or more processors of the data processing apparatus connecting to the interface are configured to perform the processing of the subset of acquired dataset, the generating of the reflectivity image, the generating of the reference dataset, the training of the NN, and the applying of the NN to the at least another processed subset.

8. The method of claim 7, wherein the data processing apparatus includes at least one of:
a memory configured to store
the seismic data,
executable codes for one or more of the processing of the subset of acquired dataset, the generating of the reflectivity image, the generating of the reference dataset, the training of the NN, and the applying of the NN to the at least another processed subset, and/or
the output dataset, the reflectivity image and/or the reference dataset; and
a display configured to display one or more of the seismic data, the processed data, the output dataset, the reflectivity image and the reference dataset.

9. The method of claim 1, wherein the processing of the subset of acquired seismic data, the generating of the reflectivity image, the generating of the reference dataset, the training of the NN, and the applying of the NN to the at least another processed subset are executable codes non-transitorily stored on a computer readable recording medium.

10. A method for exploring a subsurface formation, the method removing source effects, ghosts and multiples from seismic data using a neural network, NN, the method comprising:

selecting a first subset of seismic data acquired over the subsurface formation;

processing the first subset of the seismic data to generate a reflectivity image of the subsurface formation;

generating a reference dataset using the reflectivity image;

training the NN to map the first subset into the reference dataset; and applying the NN to a second subset of the seismic data, the NN outputting an output dataset corresponding to the second subset, the output dataset providing for an enhanced image of the subsurface formation.

11. The method of claim 10, wherein the processing of the subset of acquired data includes denoising, deblending, debubling, source signature removal, deghosting, demultipling, interpolating, regularizing and/or migrating.

12. The method of claim 10, wherein the reference dataset is generated by demigration, diffraction modeling, one-way wave-equation modeling or two-way wave-equation modeling.

13. The method of claim 1, further comprising:

obtaining the seismic data via an interface of a data processing apparatus, wherein one or more processors of the data processing apparatus connecting to the interface are configured to perform the selecting of the subset of acquired seismic data, the processing of the subset to generate the reflectivity image, the generating of the reference dataset, the training of the NN, and the applying of the NN to the at least another processed subset.

14. The method of claim 10, wherein the selecting of the subset of acquired seismic data, the processing of the subset to generate the reflectivity image, the generating of the reference dataset, the training of the NN, and the applying of the NN to the second processed subset are executable codes non-transitorily stored on a computer readable recording medium.

* * * * *